(12) United States Patent
Gundu (10) Patent No.: US 9,615,352 B2
(45) Date of Patent: Apr. 4, 2017

(54) MEDIA TRANSMISSION BEFORE FLOOR GRANT IN REAL TIME COMMUNICATION NETWORK

(75) Inventor: Veerabhadra Gundu, San Mateo, CA (US)

(73) Assignee: Sonim Technologies, Inc., San Mateo, CA (US)

( * ) Notice: Subject to any disclaimer, the term of this patent is extended or adjusted under 35 U.S.C. 154(b) by 1123 days.

(21) Appl. No.: 11/696,866

(22) Filed: Sep. 26, 2007

(65) Prior Publication Data

US 2008/0248792 A1   Oct. 9, 2008

(30) Foreign Application Priority Data

Apr. 6, 2007   (WO) .................... PCT/US07/66165

(51) Int. Cl.
*H04W 4/10*      (2009.01)
*H04W 72/00*    (2009.01)
*H04W 76/00*    (2009.01)

(52) U.S. Cl.
CPC ............ *H04W 72/005* (2013.01); *H04W 4/10* (2013.01); *H04W 76/005* (2013.01)

(58) Field of Classification Search
None
See application file for complete search history.

(56) References Cited

U.S. PATENT DOCUMENTS

| | | | |
|---|---|---|---|
| 2003/0012149 A1 | 1/2003 | Maggenti et al. | |
| 2005/0070320 A1* | 3/2005 | Dent | 455/516 |
| 2005/0141541 A1 | 6/2005 | Cuny et al. | |
| 2007/0280256 A1* | 12/2007 | Forslow | 370/395.2 |

OTHER PUBLICATIONS

International (PCT) Search Report mailed Nov. 26, 2008 re PCT/US07/066165, 2 pp.
Written Opinion of the ISA mailed Nov. 26, 2008 re PCT/US07/066165, 6 pp.

* cited by examiner

*Primary Examiner* — Philip Sobutka
(74) *Attorney, Agent, or Firm* — Rahman LLC (57) ABSTRACT

Lazy-lock control methods for use with a real-time communication network are presented, the real-time communication network incorporating a right-to-send procedure, the methods including: a) sending a first floor control request message to the real-time communication network by a first requesting user equipment (UE), the real-time communication network configured for connecting the first requesting UE with a receiving UE; b) sending a first media to the real-time communications network by the first requesting UE before receiving a floor control grant message from the real-time communications network; c) substantially simultaneously sending the floor control grant message to the first requesting UE and a floor taken message to the at least one receiving UE by the real-time communication network; and d) forwarding the first media to the at least one receiving UE by the real-time communications network.

17 Claims, 6 Drawing Sheets

MEDIA TRANSMISSION BEFORE FLOOR GRANT IN REAL TIME COMMUNICATION NETWORK

PRIORITY CLAIM

A claim for priority is hereby made under the provisions of 35 U.S.C. §365(a) for the present application based upon a PCT International Application No. PCT/US07/66165, filed on Apr. 6, 2007 in the US receiving office, which is incorporated herein by reference.

BACKGROUND

Traditional push-to-talk (PTT) services have been defined with strict floor control policies in mind where right-to-speak is enforced through a floor request procedure or a floor grant procedure during a PTT session that includes tones or announcements to indicate to a user when he shall start and stop speaking. One advantage of these procedures is that the PTT system always ensures that only one person speaks at a time. However, one disadvantage is that volley times (i.e. the time it takes from that one person stops speaking until he gets a audio response back) are often considered too long.

Push-to-talk Over Cellular (PoC) is standardized by Open Mobile Alliance (OMA). This standard is discussed in greater detail in the following technical specifications:

"Push to talk over Cellular Requirements", Candidate Version 1.0—29 Mar. 2005, OPEN MOBILE ALLIANCE™, OMA-RD-PoC-V1_0-20050329-C;

"Push to talk over Cellular Architecture", Candidate Version 1.0—27 Jan. 2006, OPEN MOBILE ALLIANCE™, OMA-AD_PoC-V1_0-20060127-C;

"PoC Control Plane", Candidate Version 1.0—27 Jan. 2006, OPEN MOBILE ALLIANCE™, OMA-TS-PoC-ControlPlane-V1_0-20060127-C; and "PoC User Plane", Candidate Version 1.0—27 Jan. 2006, OPEN MOBILE ALLIANCE™, OMA-TS_PoC-UserPlane-V1_0-20060127-C, which are hereby incorporated by reference in their entirety.

The OMA PoC Version 1 standard utilizes a Talk Burst Control Protocol (TBCP) for allocating the floor to a PoC session participant. TBCP is detailed in the OMA PoC User Plane specification. A high-level overview also exists in the OMA PoC Architecture document. The PoC server TBCP state machine manages the allocation of floor to PoC session participants. In the basic usage scenario, i.e. with no queuing of floor requests, a participant can only request the floor once the floor idle indication is received. The floor idle indication is given in the form of a tone and/or a visual display. If the participant attempts to take the floor prior to receiving a floor idle indication, then this floor request will be rejected with an error message, e.g. "other user speaking" and/or associated floor deny tone. When requesting the floor after having received a floor idle indication, the participant will need to wait for a floor granted indication before being able to speak. This time delay is added into the standard in order to ensure that only one participant can be given the floor at any given time. However, from a usability perspective, this time delay is often seen as a nuisance as the participant must depress the PTT button while waiting and listening carefully for a right-to-speak tone/visual display from the phone before starting to speak.

There is also a Version 2 of the OMA PoC Specification. The current draft documents for this release are:

"Push to talk over Cellular Requirements", Draft Version 2.0—14 Feb. 2006, OPEN MOBILE ALLIANCE™, OMA-AD_PoC-V2_0-20060214-D; and "Push to talk over Cellular Architecture", Draft Version 2.0—15 Feb. 2006, OPEN MOBILE ALLIANCE™, OMA-RD-PoC-V2_0-20060215-D, which are hereby incorporated by reference in their entirety.

Some enhancements are proposed to the Talk Burst Control Protocol (TBCP) in the OMA PoC Version 2 Requirements document of which "pre-granted media burst control" is the capability that comes closest to the current invention. Pre-granted media burst control would allow the PoC server to send a floor grant to a participant without a prior floor request. This would avoid one round-trip on the wireless network, i.e. avoiding the need to send a floor idle message from the PoC server and a floor request from the pre-granted participant. Pre-granting the floor in this manner is seen as most suitable for 1-to-1 sessions (e.g. sessions with only 2 participants), where it is likely that the participants will take turns to speak. As such a PoC server can be programmed with a simple pre-granting rule. However, no algorithms for providing smart pre-granting rules for the general case of PoC group sessions (e.g. 3 or more participants in a session) have been proposed in OMA as it typically is too difficult to predict user behavior in such scenarios. Furthermore, pre-granting the floor to a participant that is not in a position to speak can become a privacy issue if an outgoing media path from the pre-granted participant is opened automatically by the PoC client after a pre-granted floor message is received from the PoC server.

As can be understood from the pre-granted PoC group session scenario it is difficult to predict expected user behavior and as such to define the correct programming algorithm for the PoC server to apply. Some limitations of such schemes lies in the attempt to have the technology control the user. The present invention suggests a different approach (i.e. user controlled speculative media transfer) to achieve the same benefit (i.e. avoid one-roundtrip of floor control messages and as such reduce the volley time). The present invention provides for any participant to speculatively start speaking and sending media during a floor idle state rather than requiring a PoC server try to predict which user that is likely to speak next. That is, the user rather than the PoC server is in control.

Therefore, attempts to reduce the volley time by way of opportunistically sending media are provided if a floor idle indication has been received from the PTT system and as such avoiding at least one roundtrip of floor request-floor grant signaling over the wireless network. As such, systems and methods for implementing lazy-lock control procedures in real-time communication services are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

One aspect of the present invention provides a method for reducing the volley time in a real-time communications service with integrated right-to-speak controls by way of opportunistically sending media if the floor is in idle, and as such avoid one roundtrip of floor request-floor grant signaling over the access network. As such lazy-lock control methods for use with a real-time communication network are presented, the real-time communication network incorporating a right-to-send procedure, the methods including: a) sending a first floor control request message to the real-time communication network by a first requesting user equipment (UE), the real-time communication network configured for connecting the first requesting UE with a receiving UE; b) sending a first media to the real-time communications network by the first requesting UE before receiving a floor control grant message from the real-time communications network; c) substantially simultaneously sending the floor control grant message to the first requesting UE and a floor taken message to the at least one receiving UE by the real-time communication network; and d) forwarding the first media to the at least one receiving UE by the real-time communications network. In some embodiments, methods presented are operable only when the first requesting UE, the real-time communications network, and the receiving UE are all in a ready condition. In some embodiments, the ready condition includes: a first ready condition wherein the first requesting UE and the real-time communications network are in an idle state, and a second ready condition wherein the first requesting UE has priority to take floor regardless of state of the real-time communications network and the at least one UE. In some embodiments, messages and media are transmitted over an access network and an IP core, wherein access networks include: a generic packet radio service (GPRS) network, an edge network, a universal mobile telecommunications systems (UMTS) network, a code division multiple access (CDMA) network, a worldwide interoperability for microwave access (WIMAX) network, a wireless fidelity (Wi-Fi) network, and a local area network (LAN). In some embodiments, methods further include: sending a second floor control request to the real-time communication network by a second requesting UE before the step c), wherein the second requesting UE is one of the receiving UEs; sending a second media to the real-time communications network by the second requesting UE before receiving the floor control grant message from the real-time communications network before the step c); if the first requesting UE is first in time, dropping the second media, sending a floor control deny to the second requesting UE, and proceeding to the step c); else if the first control request and the second control request arrive at the real-time communications network substantially simultaneously and the first requesting UE has priority, dropping the second media, sending a floor control deny to the second requesting UE, and proceeding to the step c); and else if the first control request arrives after the second control request at the real-time communications network and the first requesting UE has priority, dropping the second media, sending a floor control deny to the second requesting UE, and proceeding to the step c).

In other embodiments, lazy-lock control methods for use with a real-time communication network utilizing a media triggered floor control system are presented, the real-time communication network incorporating a right-to-send procedure, the methods including: initiating a first floor request to a first client on a first user equipment (UE) by a first user; immediately sending a first media to the real-time communication network by the first UE; initiating a second floor request to a second client on a second user equipment (UE) by a second user; immediately sending a second media to the real-time communication network by the second UE; if the first media arrives first to the real-time communications network, granting a floor to the first UE, forwarding the first media to the second UE, and dropping the second media; else if the second media arrives first to the real-time communications network, granting the floor to the second UE, forwarding the second media to the first UE, and dropping the first media; and else if the second media arrives first to the real-time communications network and the first UE has priority, granting the floor to the first UE, forwarding the first media to the second UE, and dropping the second media. In some embodiments, the real-time communication network is a Push-to-Talk over Cellular (PoC) system. In some embodiments, the PoC system includes a PoC server for handling messages and media between the first UE and the second UE. In some embodiments, the first UE and the second UE each include a PoC client for communicating with the PoC server; and a user interface for providing user input to the PoC system and for providing PoC system output to a user.

In other embodiments, a computer-usable media having computer readable instructions stored thereon for execution by a processor to perform a lazy-lock control method for use with a real-time communication network are presented, the real-time communication network incorporating a right-to-send procedure comprising: a) instructions for sending a first floor control request message to the real-time communication network by a first requesting user equipment (UE), the real-time communication network configured for connecting the first requesting user equipment with at least one receiving UE; b) instructions for sending a first media to the real-time communications network by the first requesting UE before receiving a floor control grant message from the real-time communications network; c) instructions for substantially simultaneously sending the floor control grant message to the first requesting UE and a floor taken message to the at least one receiving UE by the real-time communication network; and d) instructions for forwarding the first media to the at least one receiving UE by the real-time communications network.

In other embodiments, computer-usable media having computer readable instructions stored thereon for execution by a processor to perform a lazy-lock control method for use with a real-time communication network utilizing a media triggered floor control system are presented, the real-time communication network incorporating a right-to-send procedure, comprising: instructions for initiating a first floor request to a first client on a first user equipment (UE) by a first user; instructions for immediately sending a first media to the real-time communication network by the first UE; instructions for initiating a second floor request to a second client on a second user equipment (UE) by a second user; instructions for immediately sending a second media to the real-time communication network by the second UE; if the first media arrives first to the real-time communications network, instructions for granting a floor to the first UE, instructions for forwarding the first media to the second UE, and instructions for dropping the second media; and else if the second media arrives first to the real-time communications network, instructions for granting the floor to the second UE, instructions for forwarding the second media to the first UE, and instructions for dropping the first media; and else if the second media arrives first to the real-time communications network and the first UE has priority, instructions for granting the floor to the first UE, instructions for forwarding the first media to the second UE, and instructions for dropping the second media.

BRIEF DESCRIPTION OF THE DRAWINGS

The present invention is illustrated by way of example, and not by way of limitation, in the figures of the accompanying drawings and in which like reference numerals refer to similar elements and in which.

GLOSSARY

| | |
|---|---|
| DM - Device Management | OMA defined protocol for bootstrapping handsets with configuration data from a Over-the-Air (OTA) provisioning server. |
| GPRS - Generic Packet Radio Service | Packet switched service on GSM networks that provides an Internet Protocol bearer for applications such as PoC. |
| GSM - Global System for Mobile communication | The second generation digital technology originally developed for Europe but which now has in excess of 71% of the world market. Initially developed for operation in the 900 MHz band and subsequently modified for the 850, 1800 and 1900 MHz bands. |
| IMS Core - IP Multimedia Subsystem | The SIP/IP Core that controls call sessions over IP networks in cellular networks. |
| OMA - Open Mobile Alliance | Standardization organization focused on mobile application specifications such as PoC. |
| PoC - Push to Talk over Cellular | Push to Talk standard from OMA using the IP bearer of cellular packet switched networks such as GPRS. |
| PTT - Push to Talk | Similar to conventional walkie-talkie communication - users send a voice message to one or more recipients from a mobile phone by pushing a key. |
| RTP - Real-time Transfer Protocol | An IETF protocol for real-time transmission of audio and video. Current IETF RFC is 3550. http://www.ietf.org/rfc/ffc3550.txt |
| Shared XDMS - Shared XML Document Management Server | An XCAP server that manages XML documents (e.g. Contact Lists) that are needed for the PoC service and which may be shared with other service enablers (e.g. Presence). |
| SIP - Session Initiation Protocol | A signaling protocol for Internet conferencing, telephony, presence, events notification, and instant messaging. The current IETF RFC is 3261. http://www.ietf.org/rfc/rfc3261.txt?number=3261 |
| TBCP - Talk Burst Control Protocol | A floor control protocol defined by OMA for Push-to-Talk over Cellular (PoC) using RTP control messages. |
| UE - User Equipment | A terminal (e.g. handset or PC) with the PoC client application installed. |
| XCAP - XML Configuration Access Protocol | XCAP allows a client to read, write, and modify application configuration data, stored in XML format on a server. XCAP maps XML document sub-trees and element attributes to HTTP URIs, so that these components can be directly accessed by HTTP. |
| XDMC - XML Document Management Client | An XCAP client that manages XML documents stored in the network (e.g. PoC-specific documents in the PoC XDMS, Contact Lists in the Shared XDMS, etc). |
| XDMS - XML Document Management Server | An XCAP server that manages XML documents (e.g. Contact Lists) that are utilized by various applications. Each application has its own designated XDMS (e.g. PoC XDMS) and can utilize the Shared XDMS. |

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The invention is described with reference to specific architectures and protocols. Those skilled in the art will recognize that the description is for illustration and to provide the best mode of practicing the invention. The description is not meant to be limiting. For example, reference is made to an OMA PoC system, while other types of PTT systems using any mobile or fixed access network can also benefit form the present invention. Likewise, reference is made to PTT sessions, while the present invention can be applied to other types of VOIP conference calls where floor control policies are applied.

Figure 1:
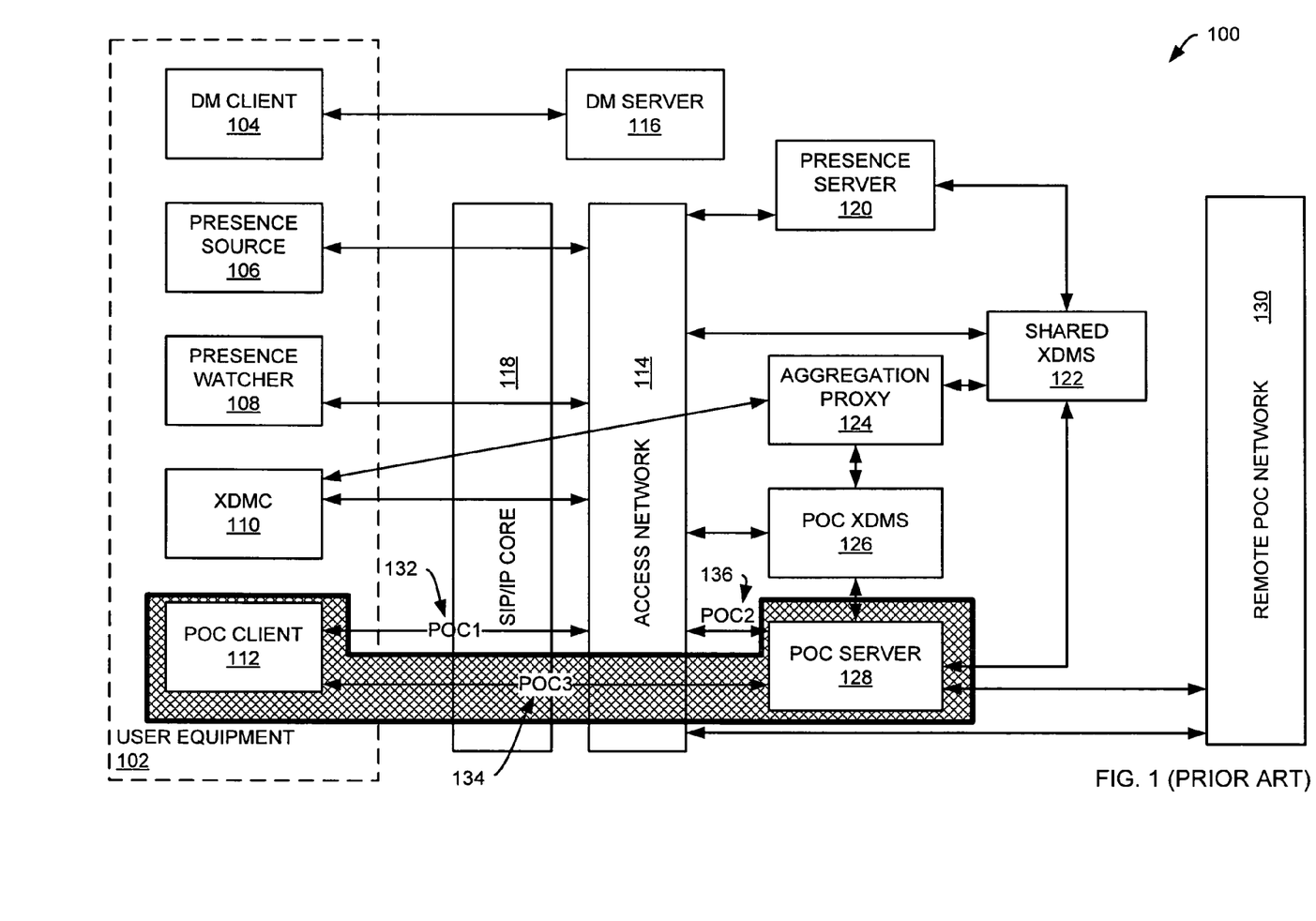
FIG. 1 is an illustrative representation of a prior art PoC System Architecture in accordance with OMA version 1 specifications.

FIG. 1 is an illustrative representation of a prior art PoC System architecture 100 in accordance with OMA version 1 specifications. An OMA PoC system architecture 100 includes User Equipment (UE) 102 and a set of network components. As illustrated, UE 102 contains the necessary pieces to interface the user acting as participant in a PoC session under the OMA version 1 specifications. UE 102 can either be a mobile terminal, a PC or any other device connected to the access network. Device Management (DM) client 104 inside UE 102 is used to bootstrap UE 102 with necessary configuration data from a DM server 116. An XML Document Management Client (XDMC) 110 is used to download and update by request any relevant contact lists stored in Shared XML Document Management Server (XDMS) 122. An Aggregation Proxy 124 may be configured to perform the authentication of any such requests. Similarly, the XDMC 110 is also configured to communicate via Aggregation Proxy 124 with PoC-specific XDMS (PoC XDMS) 126 for the purpose of managing group policies and authorization lists. UE 102 further includes Presence Source 106 and Presence Watcher 108. Presence Source 106 may be configured to publish a UE's availability status to other users. Presence Watcher 108 may be configured to retrieve availability status of others (e.g. other UEs and contacts). Both UE presence entities communicate with Presence Server 120 via a SIP/IP Core 118. In an OMA PoC system built on top of a GPRS radio network, a SIP/IP Core is often a IP Multimedia Subsystem (IMS) as standardized by the 3rd Generation Partnership Project (3GPP).

A PoC client's main responsibilities are: session management, SIP registration, TBCP request-response management, media transmission, and media reception. Under existing standards, session management, SIP registration may be accomplished over POC-1 and POC-2 interfaces 132 and 136 respectively. Furthermore, TBCP request-response management, media transmission, and media may be accomplished over POC-3 interface 134. PoC server 128 is responsible for application level network functionality including PoC session establishment, termination, handling of TBCP messages and media switching between the participating clients.

Embodiments of the present invention relate specifically to POC-3 interface transmissions occurring between a PoC client and a PoC server. A POC-3 interface, in accordance with OMA standards, applies Talk Burst Control Protocol (TBCP) as a floor control protocol and sends media using the Real-Time Transfer Protocol (RTP). Floor control refers to permission for a UE to speak or otherwise send media. TBCP state machines are instantiated in both PoC clients and PoC servers after a successful SIP session establishment has occurred on POC-1 and POC-2 interfaces. In an OMA PoC system, when a PoC client sends a TBCP_Request message to a PoC server to ask for the permission to talk, the PoC server determines an appropriate response. That is, whether or not to grant permission based on floor availability. This response may be communicated back to the PoC client using appropriate messages (e.g. TBCP_Grant or TBCP_Deny). When a PoC server sends a TBCP_Grant message, permission to speak is granted to the requesting PoC client whereupon the requesting PoC client's media may be forwarded to other session participants. When a PoC server sends a TBCP_Deny message, permission to speak is denied to the requesting PoC client whereupon the requesting PoC client's media may be dropped by the PoC server.

Figure 2:
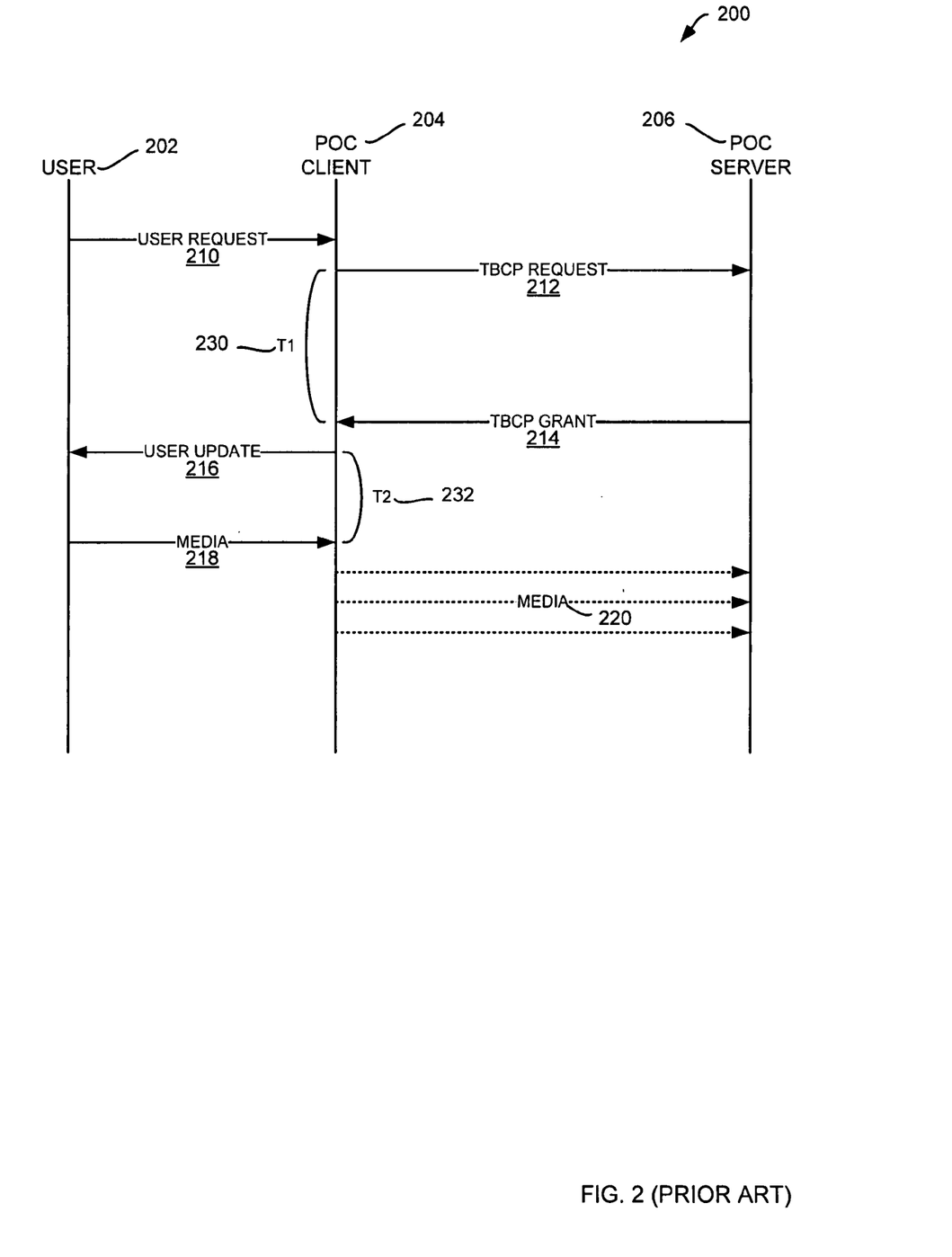
FIG. 2 is an illustrative representation of a OMA PoC version 1 mechanism for handling floor request and responses and for sending media.

FIG. 2 is an illustrative representation of a OMA PoC version 1 mechanism for handling floor request and responses and for sending media. The mechanisms illustrated in FIG. 2 are enabled over a POC-3 interface between a PoC client a PoC server. A basic request procedure includes:

1. User 202 presses and holds down a PTT button on a UE to request permission to speak 210.

2. A PoC client 204 associated with user 202 sends a TBCP_Request message 212 to PoC server 206 and waits for the response from PoC server 206.

3. Based on a current floor condition, PoC server 206 generates a response for PoC client 204. If permission is granted, PoC 206 server generates a TBCP_Grant message and sends the TBCP_Grant message to PoC client 204. Permission may be granted, for example, when the floor is idle or when the floor is allocated to a client having a lower priority than a requesting PoC client.

4. Upon receiving the TBCP_Grant message 214 from PoC server 206, a PoC client application initiates an audio subsystem. An audio subsystem may be configured to provide a user update 216, which may include a tone, a displayed message, or both to indicate to a user that the user may begin speaking.

5. After user 202 receives user update 216, user begins speaking whereupon media 218 (i.e. voice data stream) may be sent to PoC client 204 and subsequently transferred as media 220 to PoC server 206. In some examples, transfers to a PoC server are accomplished over RTP.

The time between sending a TBCP_Request message and receiving a TBCP_Grant message is denoted as T1 230. In a typical GPRS network, T1 has been measured to be approximately 1.5 seconds. T1 represents a sum of: the time required to request a traffic channel (100-200 milliseconds (ms)), the time required to send a TBCP Request and receive a TBCP_Grant message (1000 ms), and the time required to start an audio subsystem (200 ms on a Symbian handset). In addition, the time between receiving a user update by a user and sending media by a user is denoted as T2 232. T2 is typically measured at a range of approximately 300-500 ms. The range of T2 depends primarily on the type of terminal platform being utilized, a user's readiness to speak, and a negotiated frame packetization ratio (also called ptime). T2 may be reduced by applying a variable frame packetization ratio (small sized packets initially) as well as by sending dummy packets prior to media in order to pre-allocate a radio channel. In GPRS systems, sending dummy packets in this manner may trigger either uplink or downlink Extended Temporary Block Flow (TBF) Release, which in turn may shorten the time required for radio resource allocation on an uplink when media arrives.

Figure 3:
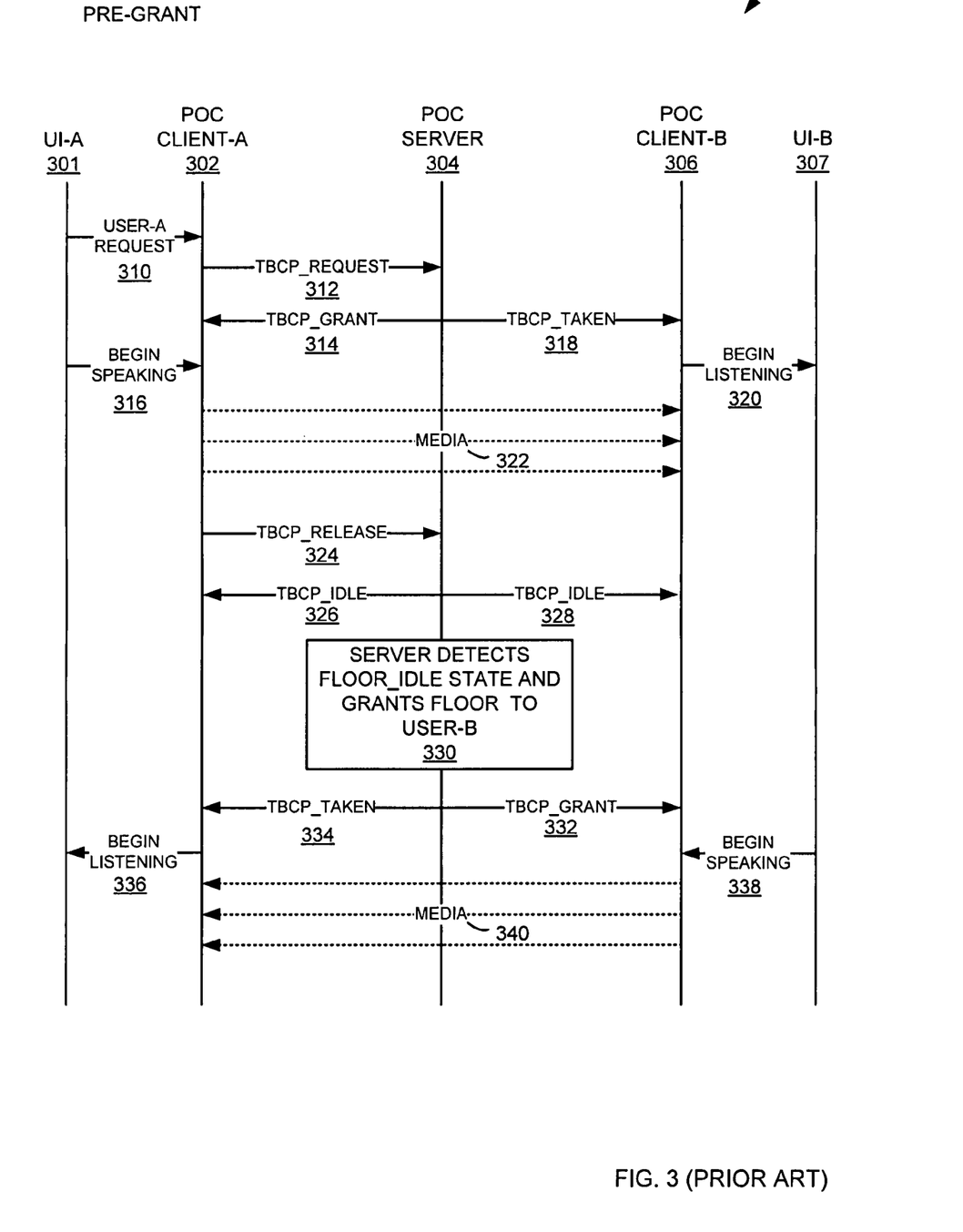
FIG. 3 is an illustrative representation of a floor pre-grant to a selected participant in floor idle state in accordance with OMA PoC version 2 procedures.

FIG. 3 is an illustrative representation of a prior art floor pre-grant to a selected participant during a floor_idle state 300 in accordance with OMA PoC version 2 procedures.

FIG. 3 shows a proposed implementation that complies with requirements of the OMA PoC version 2 for pre-granting the floor to one or more participants when the PoC Server 304 is in a floor_idle state. In accordance with the prior art implementation, a user-A 301 may make a user-A request 310 for the floor. PoC client-A 302 receives user-A request 310 and subsequently issues a TBCP_Request message 312 to PoC server 304. PoC server 304 then issues a TBCP_Grant message 314 to PoC Client-A 302 and a TBCP_Taken message 318 to PoC client-B 306. User-A may then begin speaking 316. PoC client-A 302 then sends media 322, whereupon user-B 307 begins listening 320. After media 332 has been sent, PoC client-A 302 issues a TBCP-Release message to PoC server 304. PoC server 304 may then issue a TBCP_Idle message 326 to PoC client-A 302 and a TBCP_Idle message 328 to PoC client-B 306. As per this proposed implementation, PoC server 304 detects a floor_idle state 330 after PoC client-A 302 releases the floor. PoC server 304 may then assign the floor to User-B 306 with a TBCP_Grant message 332 and a TBCP_Taken message 334 to PoC client-A 302 without requiring a TBCP_Request message from PoC client-B 306. Pre-granting of floor may, in some examples, avoid a roundtrip on an access network by eliminating the need for sending and receiving TBCP_Idle and TBCP_Request messages. Generally speaking however, pre-granting of floor is mainly applicable to 1-to-1 sessions since pre-granting involves some level of prediction of participant interaction. Pre-granting does not work as well for group sessions because group interactions are much less reliable thus making prediction much more difficult.

Figure 4:
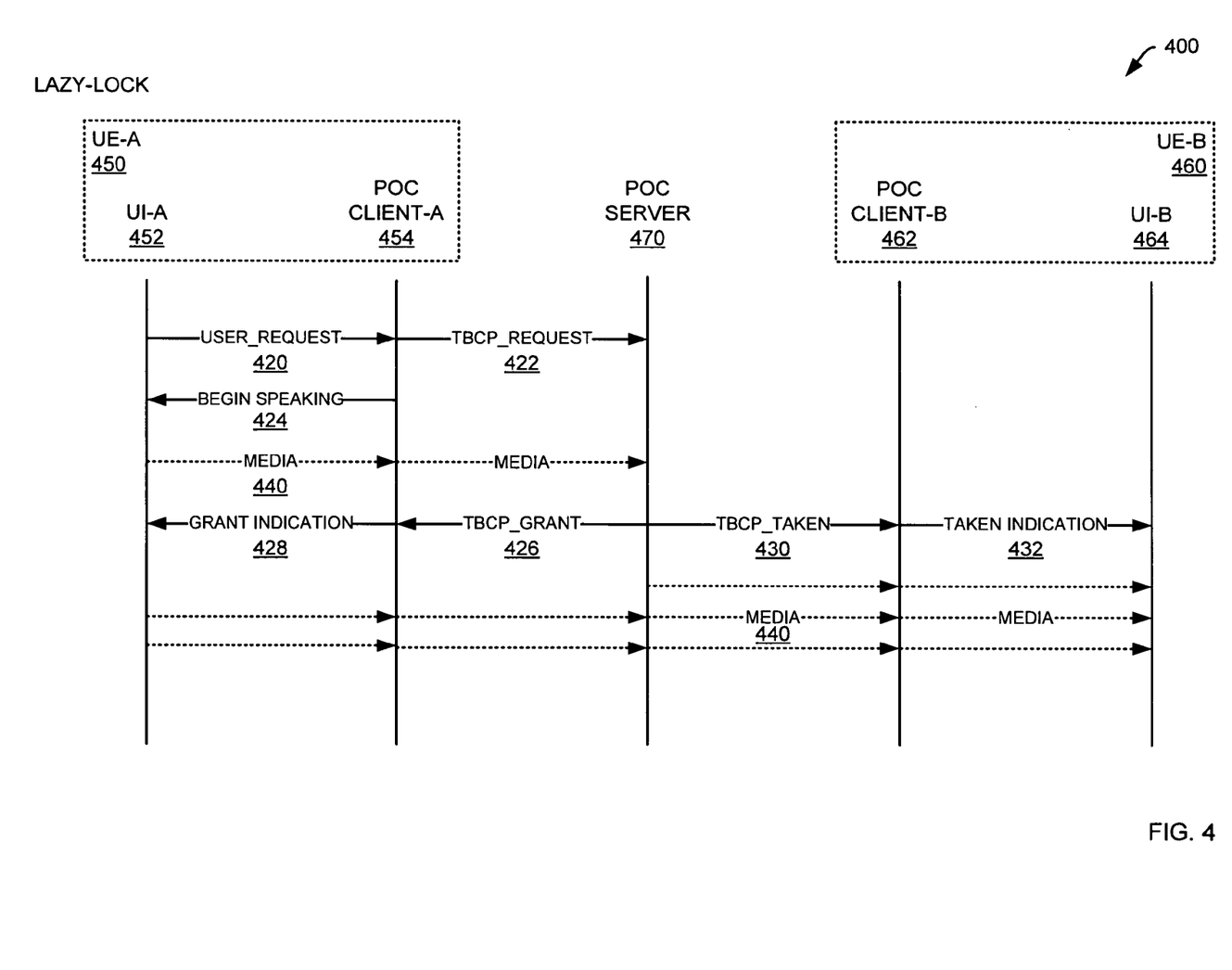
FIG. 4 is an illustrative dataflow of an optimized lazy-lock floor control procedure where floor is granted in accordance with embodiments of the present invention.

FIG. 4 is an illustrative dataflow of an optimized lazy-lock floor control procedure 400 where floor is granted in accordance with embodiments of the present invention. Lazy-lock floor control procedure manages requests for floor control, responses to requests, and media transmissions. FIG. 4 illustrates an example where a floor is granted using methods provided herein. Lazy-lock floor control procedure may be considered, to a large extent, a PoC client enhancement and is configured to be interoperable with any Version 1 or Version 2 OMA PoC compatible systems. For a lazy-lock control procedure to function, floor control state machines must generally be in an idle state for both the PoC server and all associated PoC clients (e.g. PoC client-A and PoC client-B). Thus, user-a 452 issues a user_Request 420 when user-A 452 desires to send media. If PoC client-A 454 on user equipment (UE) 450, PoC server 470, and PoC client-B 462 on UE 460 are in an idle state, embodiments of lazy-lock floor control procedure may be readily utilized. Utilizing lazy-lock floor control procedure, PoC client-A 454 sends a TBCP_Request message 422 in response to user_Request 420, but does not wait for a TBCP_Grant message as in conventional methods (see FIG. 3) before sending media 440. If PoC server 470 ultimately grants the floor to PoC client-A 452, then PoC server 470 sends a TBCP_Grant message 426 to PoC client-A 454 and TBCP_Taken message 430 to PoC client-B 462. From a PoC server's 470 viewpoint, media 440 sent by PoC client-A 454, in this example, arrives only slightly earlier than normal, but does not interfere with OMA PoC server procedures that require a grant before media is forwarded. Thus, media 440 may be forwarded to PoC client-B 462 since the floor has already (even if very recently) been allocated correctly to PoC client-A 454 by PoC sever 470. Further, although TBCP_Grant message 426 and TBCP_Taken message 430 may not have reached their respective endpoints (PoC client-A 454 and PoC client-B 462) as conventionally enabled, the messages nonetheless arrive "just-in-time" albeit by a small margin.

As noted above for FIG. 2, in a typical GMS Packet Radio Service (GPRS) network, T1 230 has been measured to be approximately 1.5 seconds where T1 230 represents a sum of: the time required to request a traffic channel (100-200 ms), the time required to send a TBCP Request and receive a TBCP_Grant message (1000 ms), and the time required to start an audio subsystem (200 ms on a Symbian handset). In contrast, as illustrated by FIG. 4, embodiments of the present invention reduce T1 432 that result in a successful TBCP_Grant message eliminate the time required to send a TBCP Request message and receive a TBCP_Grant message (1000 ms). Thus, utilizing embodiments described herein may result in a reduction of approximately 1000 ms for a transmission, which may significantly improve a user's transmission experience by more closely resembling a cellular phone interaction. These efficiencies may be particularly useful when using GPRS as an access network and a Symbian phone as user equipment. In some embodiments, the remaining 500 ms may be further reduced if a user update is eliminated and an audio subsystem is already available in a recording mode.

Figure 5:
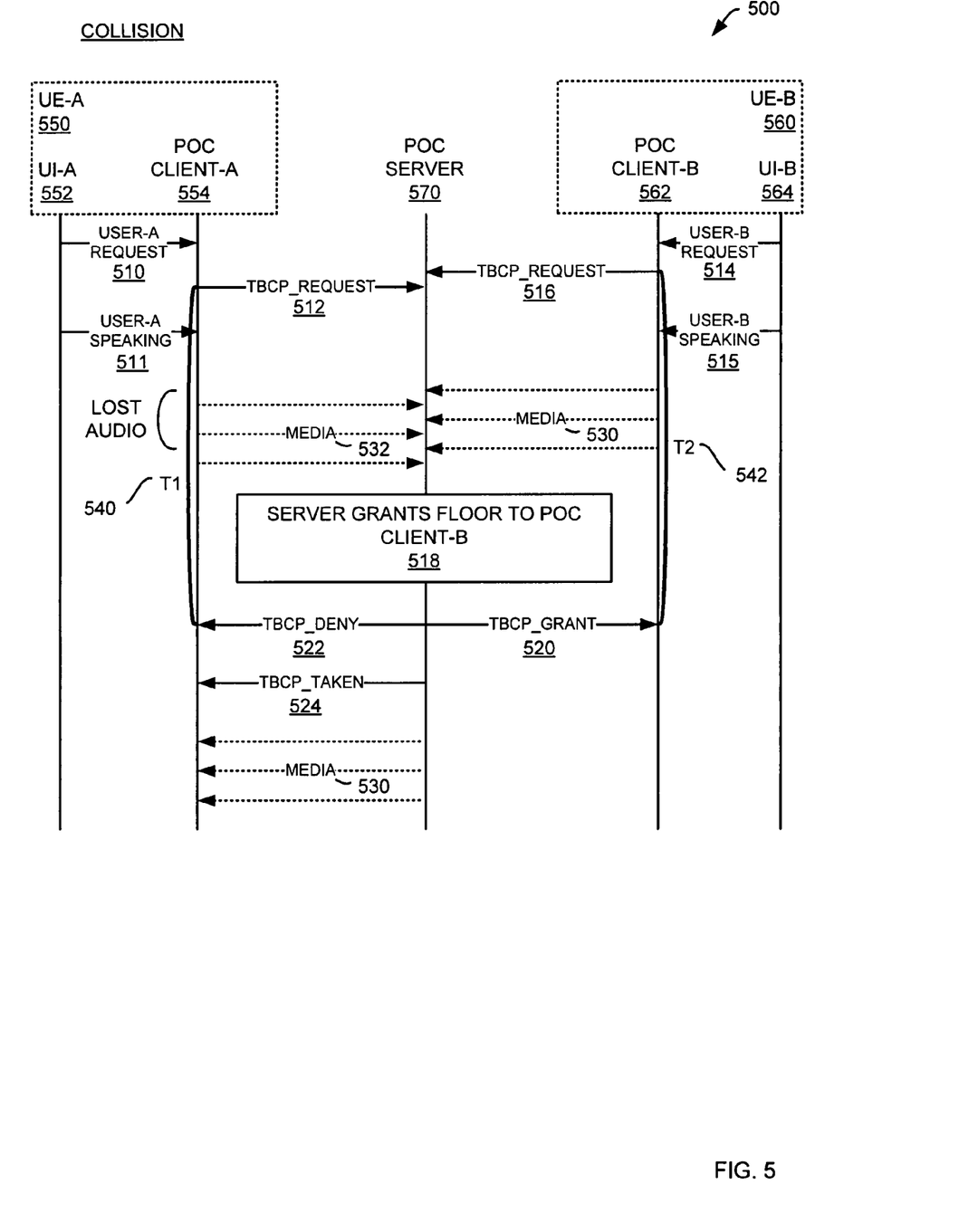
FIG. 5 is an illustrative dataflow of an optimized lazy-lock floor control procedure where floor is denied in accordance with embodiments of the present invention.

FIG. 5 is an illustrative dataflow of an optimized lazy-lock floor control procedure where floor is denied 500 in accordance with embodiments of the present invention. Lazy-lock floor control procedure manages requests for floor control, responses to requests, and media transmissions. FIG. 5 illustrates an example where a floor is denied due to a collision using methods provided herein. Thus, in the following illustrative example, user-A 552 (utilizing UE-A 550) issues a user-A_Request message 510 while user-B 564 (utilizing UE-B 560) issues user-B_Request message 514. In this example embodiment, TBCP_Request message 516 from PoC Client-B 562 may arrive first in time to PoC Server 570 over TBCP_Request message 512 from PoC Client-A 554. Similarly, media 530 from PoC Client-B 562 arrives first in time to PoC server 570 over media 532 from PoC Client-A 554. In this example, PoC server 570 may grant the floor to one user over the other 518. In other example embodiments, TBCP_Request message 516 from PoC Client-B 562 may arrive substantially simultaneously in time to PoC Server 570 over TBCP_Request message 512 from PoC Client-A 554. In those examples, PoC server 570 may grant the floor to a user having priority over another user.

FIG. 5 illustrates a use case where PoC server 570 grants the floor to user-B by sending TBCP_Grant message 520 to PoC client-B 562. PoC server 570 also issues a TBCP_Deny message 522 followed by a TBCP_Taken message 524 to PoC client-A 554. PoC sever 570 may then drop media 532 that was sent by PoC client-A 554. PoC client-A 554, having received both TBCP messages, may then provide a floor taken indication to user-A 552 and subsequently play out media 530 as received from PoC client-B 562 via PoC server 570. Additionally, in other examples, TBCP_Request message 512 as originally sent by PoC client-A 554 may be dropped by the access network. When PoC server 570 begins to receive media 532 without a corresponding TBCP_Request message, media 532 will be dropped by PoC server 570 as per the OMA standard. PoC server 570 may then send a TBCP_Revoke message to PoC Client-A 554 and may, in some examples, include a reason code field 'No permission to send a Talk Burst' followed by a TBCP_Idle message. The reason code field may be displayed to user-A whereupon user-A can may initiate a floor request again.

In this embodiment, the time required to receive a TBCP_Deny or TBCP-Revoke T1 540 message is similar to T1 230 as illustrated in FIG. 2. In other words, a worst case scenario for embodiments of lazy-lock control procedure does not prolong the time for notification as compared with a standard OMA PoC scenario. Fortunately, this worst case scenario almost never occurs in 1-to-1 PoC sessions as the floor typically alternate between User-A and User-B naturally based on natural conversational conventions. Based on deployment experience, the occurrence of this TBCP_Deny scenario is not very frequent even in group conversations. In group conversations, the time window for simultaneous request collisions is established as a one second maximum, i.e. the time required to send a TBCP_Request message from a first PoC client to a PoC server plus the time required to send a TBCP_Taken message from a PoC Server to a second PoC client. The PoC server latency is less than 20 ms and is, therefore, negligible. Furthermore, user studies have shown that it is considered natural user behavior for user-A to cease talking upon hearing user-B speaking given. This behavior is consistent in full-duplex (and face-to-face) conversations as well. An added benefit of not having to press down a PTT button and wait for a start-to-speak tone for 1.5 seconds may, in some examples, outweigh the negative aspects of this failure case scenario.

It may be appreciated that several embodiments of the present invention related to the lazy-lock floor control procedure as presented above are possible. For example, lazy-lock floor control procedure includes speculatively sending media as described above. Speculative sending may, in some examples, be combined with a OMA PoC Version 2 proposal, which is illustrated in FIG. 3. In one embodiment, pre-granting the floor to certain participants is possible. Pre-granting restricts a set of participants that are allowed to make a speculative media sending. If a PoC server adds a pre-granting flag in a TBCP_Idle message, only participants that receive the TBCP_Idle message with a pre-granting flag will be enabled to apply lazy-lock control procedures and speculatively send media directly after a TBCP_Request message.

Figure 6:
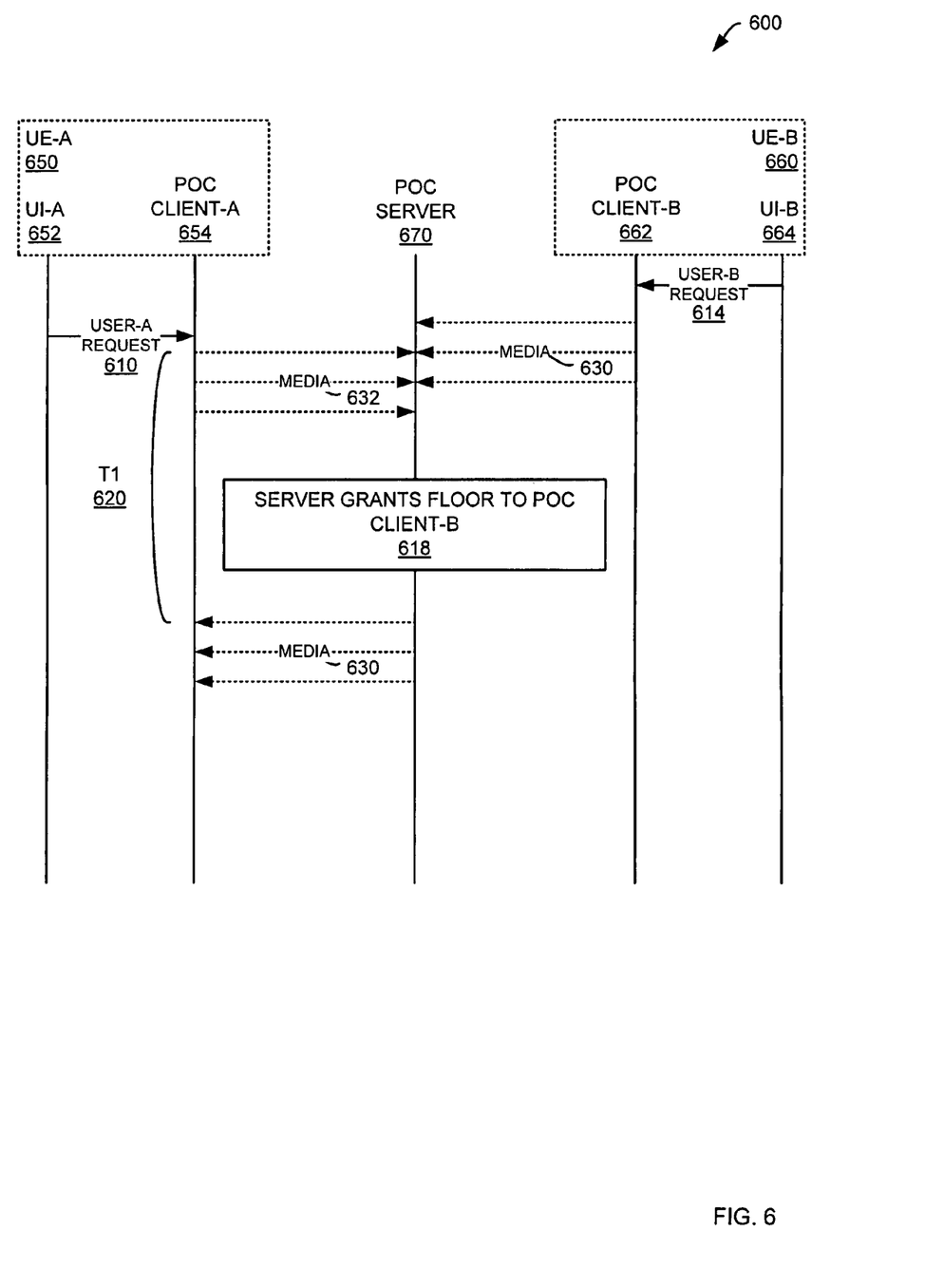
FIG. 6 is a dataflow of an optimized lazy-lock floor control procedure without floor control messages in accordance with an embodiment of the present invention.

FIG. 6 is a dataflow of an optimized lazy-lock floor control procedure without floor control messages 600 in accordance with an embodiment of the present invention. Furthermore, FIG. 6 illustrates an embodiment where the reception of media is utilized to drive floor state changes for both PoC servers and PoC clients. Thus, user-A 652 (utilizing UE-A 650) may issue a user-A_Request message 610 to PoC client-A 654. Similarly, user-B 664 (utilizing UE-B 660) may issue a user-B_Request message 614 to PoC client-B 662. Neither PoC Client-A 654 nor PoC Client-B 662 issue a TBCP_Request message to PoC server 670 as in previous examples. At this point, PoC server 670 is not receiving any media or messages and is, therefore, in a floor_idle state. Subsequently, PoC client-A 654 transmits media 632 to PoC server 670. Likewise, PoC client-B 662 transmits media 630 to server 670. As illustrated, PoC client-B 662 transmits before PoC client-A 654. As such, PoC server 670 grants the floor to PoC client-B 662 based on order received 618. As noted above for FIG. 5, when media arrives at PoC server 670 substantially simultaneously, then PoC server 670 may grant floor control based on priority. PoC server 670 may then move from a floor_idle state to a floor_taken state. PoC server 670 then forwards media 630 to all other users in the session (in this case to PoC Client-A 654). As illustrated, no explicit TBCP_Taken message is sent to either PoC client. The mere lack of any incoming media, provides sufficient indication for user-B that his implicit floor request was granted and that his media was forwarded to user-A.

If, in some examples, user-A 652 depresses a PTT button after user-B 664, but before user-A 652 has received any incoming media, PoC client-A 654 will still consider the floor as in an idle state and indicate that user-A 652 should begin speaking. Like PoC client-B 662, PoC client-A 654 will immediately begin streaming media 632 towards the PoC server 670 after depressing a PTT button. However, because PoC server 670 has already allocated the floor to PoC Client-B 662, PoC Server 670 will drop PoC Client-A media 632 as described in detail above for FIG. 5. However, instead of sending an explicit TBCP_Deny message to PoC client-A 654, PoC server 670 instead indicates that the floor is occupied by forwarding user-B media 630. PoC client-A 654 may subsequently relay this media to user-A 652. User-A 652 may then choose to stop speaking and to begin listening to user-B media instead.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. It is therefore intended that the following appended claims be interpreted as including all such alterations, permutations, and equivalents as fall within the true spirit and scope of the present invention.

What is claimed is:

1. A control method for use with a real-time communication network, the real-time communication network incorporating a right-to-send procedure, the method comprising:
   a) sending a first floor control request message to a Push-to-Talk over Cellular (PoC) client on a first requesting User Equipment (UE) to the real-time communication network, wherein the real-time communication network is configured for connecting the first requesting UE with a PoC client on at least one receiving UE;
   b) immediately sending a first media to the real-time communication network by the first requesting UE in response to receiving a begin speaking indication from the PoC client on the first requesting UE, wherein the first media is sent before receiving a floor control grant message from the real-time communications network;
   c) substantially simultaneously sending the floor control grant message to the first requesting UE and a floor taken message to the at least one receiving UE by the real-time communication network; and
   d) forwarding the first media to the at least one receiving UE by the real-time communications network;
   wherein the first requesting UE, the real-time communications network, and the at least one receiving UE are all in a ready condition, wherein the ready condition is selected from the group consisting of: a first ready condition wherein the first requesting UE and the real-time communication network are in an idle state and a second ready condition, wherein the first requesting UE has priority to take floor regardless of state of the real-time communications network and the at least one receiving UE.

2. The method of claim 1, wherein when the first requesting UE and the at least one receiving UE are not in the first ready condition, the method further comprises:

sending a floor control deny message to the first requesting UE by the real-time communication network; and
dropping the first media after sending the floor control deny message to the first requesting UE.

3. The method of claim 1, wherein the real-time communication network is a Push-to-Talk over Cellular (PoC) system.

4. The method of claim 3, wherein the PoC system includes a PoC server for handling messages and media between the first requesting UE and the at least one receiving UE.

5. The method of claim 1, wherein the first requesting UE and the at least one receiving UE each include:
the PoC client for communicating with the PoC server; and
a user interface for providing user input to the PoC system and for providing PoC system output to a user.

6. The method of claim 1, wherein the media is selected from the group consisting of: audio data, text data, image data, and video data.

7. The method of claim 1, wherein the right-to-send procedure is interoperable with a standard selected from the group consisting of: Open Mobile Alliance (OMA) PoC version 1 and OMA PoC version 2.

8. The method of claim 1, further comprising:
sending a second floor control request to the real-time communication network by a second requesting UE before the step c), wherein the second requesting UE is one of the at least one receiving UEs;
sending a second media to the real-time communications network by the second requesting UE before receiving the floor control grant message from the real-time communications network before the step c);
if the first requesting UE is first in time,
dropping the second media,
sending a floor control deny to the second requesting UE, and
proceeding to the step c);
else if the first control request and the second control request arrive at the real-time communications network substantially simultaneously and the first requesting UE has priority,
dropping the second media,
sending a floor control deny to the second requesting UE, and
proceeding to the step c); and
else if the first control request arrives after the second control request at the real-time communications network and the first requesting UE has priority,
dropping the second media,
sending a floor control deny to the second requesting UE, and
proceeding to the step c).

9. A control method for use with a real-time communication network utilizing a media triggered floor control system, the real-time communication network incorporating a right-to-send procedure, the method comprising:
initiating a first floor control request to a Push-to-Talk over Cellular (PoC) client on a first user equipment (UE) by a first user;
immediately sending a first media to the real-time communication network by the first UE, in response to receiving a begin speaking indication from the PoC client on the first UE;
initiating a second floor control request to a PoC client on a second user equipment (UE) by a second user;
immediately sending a second media to the real-time communication network by the second UE, in response to receiving a begin speaking indication from the PoC client on the second UE;
substantially simultaneously sending the floor control grant message to the first requesting UE and a floor taken message to the second UE by the real-time communication network:
if the first media arrives first to the real-time communications network,
granting a floor to the first UE,
forwarding the first media to the second UE, and
dropping the second media;
else if the second media arrives first to the real-time communications network,
granting the floor to the second UE,
forwarding the second media to the first UE, and
dropping the first media; and
else if the second media arrives first to the real-time communications network and the first UE has priority,
granting the floor to the first UE,
forwarding the first media to the second UE, and
dropping the second media.

10. The method of claim 9, wherein the real-time communication network is a Push-to-Talk over Cellular (PoC) system.

11. The method of claim 10, wherein the PoC system includes a PoC server for handling messages and media between the first UE and the second UE.

12. The method of claim 11, wherein the messages and media are transmitted over an access network and an SIP/IP core.

13. The method of claim 9, wherein the first UE and the second UE each include:
the PoC client for communicating with the PoC server; and
a user interface for providing user input to the PoC system and for providing PoC system output to a user.

14. The method of claim 9, wherein the right-to-send procedure is interoperable at a real-time communications network level with a standard selected from the group consisting of: OMA PoC version 1 and OMA PoC version 2.

15. A non-transitory computer-usable medium having computer readable instructions stored thereon for execution by a processor to perform a control method for use with a real-time communication network, the real-time communication network incorporating a right-to-send procedure comprising:
a) instructions for sending a first floor control request message to a Push-to-Talk over Cellular (PoC) client on a first requesting User Equipment (UE) to the real-time communication network, wherein the real-time communication network is configured for connecting the first requesting UE with a POC client on at least one receiving UE;
b) instructions for immediately sending a first media to the real-time communication network by the first requesting UE in response to receiving a begin speaking indication from the PoC client on the first requesting UE, wherein the first media is sent before receiving a floor control grant message from the real-time communications network;
c) instructions for substantially simultaneously sending the floor control grant message to the first requesting UE and a floor taken message to the at least one receiving UE by the real-time communication network; and d) instructions for forwarding the first media to the at least one receiving UE by the real-time communications network wherein the first requesting UE, the real-time communications network, and the at least one receiving UE are all in a ready condition, wherein the ready condition is selected from the group consisting of: a first ready condition wherein the first requesting UE and the real-time communications network are in an idle state, and a second ready condition, wherein the first requesting UE has priority to take floor regardless of state of the real-time communications network and the at least one UE.

16. The non-transitory computer-usable medium of claim 15, further comprising:

instructions for sending a second floor control request to the real-time communication network by a second requesting UE before the step c), wherein the second requesting UE is one of the at least one receiving UEs;

instructions for sending a second media to the real-time communications network by the second requesting UE before receiving the floor control grant message from the real-time communications network before the step c);

if the first requesting UE is first in time,
  instructions for dropping the second media,
  instructions for sending a floor control deny to the second requesting UE, and
  instructions for proceeding to the step c);

else if the first control request and the second control request arrive at the real-time communications network substantially simultaneously and the first requesting UE has priority,
  instructions for dropping the second media, instructions for sending a floor control deny to the second requesting UE, and
  instructions for proceeding to the step c); and else if the first control request arrives after the second control request at the real-time communications network and the first requesting UE has priority,
  instructions for dropping the second media,
  instructions for sending a floor control deny to the second requesting UE, and
  instructions for proceeding to the step c).

17. A non-transitory computer-usable medium having computer readable instructions stored thereon for execution by a processor to perform a control method for use with a real-time communication network utilizing a media triggered floor control system, the real-time communication network incorporating a right-to-send procedure, comprising:

instructions for initiating a first floor request to a PoC client on a first user equipment (UE) by a first user;

instructions for immediately sending a first media to the real-time communication network by the first UE, in response to receiving a begin speaking indication from the PoC client;

instructions for initiating a second floor request to a PoC client on a second user equipment (UE) by a second user;

instructions for immediately sending a second media to the real-time communication network by the second UE;

instructions for substantially simultaneously sending the floor control grant message to the first requesting UE and a floor taken message to the second UE by the real-time communication network:

if the first media arrives first to the real-time communications network,
  instructions for granting a floor to the first UE,
  instructions for forwarding the first media to the second UE, and
  instructions for dropping the second media; and else if the second media arrives first to the real-time communications network,
  instructions for granting the floor to the second UE,
  instructions for forwarding the second media to the first UE, and
  instructions for dropping the first media; and else if the second media arrives first to the real-time communications network and the first UE has priority,
  instructions for granting the floor to the first UE,
  instructions for forwarding the first media to the second UE, and
  instructions for dropping the second media.

* * * * *